United States Patent [19]

Moses et al.

[11] Patent Number: 5,678,632
[45] Date of Patent: Oct. 21, 1997

[54] ACIDIZING UNDERGROUND RESERVOIRS

[75] Inventors: Vivian Moses, London; Ralph Harris, Surrey, both of United Kingdom

[73] Assignee: Cleansorb Limited, United Kingdom

[21] Appl. No.: 537,693
[22] PCT Filed: Apr. 29, 1994
[86] PCT No.: PCT/GB94/00922
  § 371 Date: Feb. 28, 1996
  § 102(e) Date: Feb. 28, 1996
[87] PCT Pub. No.: WO94/25731
  PCT Pub. Date: Nov. 10, 1994

[30] Foreign Application Priority Data

Apr. 29, 1993 [GB] United Kingdom ............ 9308884

[51] Int. Cl.$^6$ .................................. E21B 43/27
[52] U.S. Cl. ........................................ 166/307
[58] Field of Search ........................ 166/246, 305.1, 166/307

[56] References Cited

U.S. PATENT DOCUMENTS 2,863,832 12/1958 Perrine .
3,630,285 12/1971 Claytor, Jr. et al. .
4,506,734 3/1985 Nolte .
5,560,737 10/1996 Schuring et al. ............ 166/246 X

FOREIGN PATENT DOCUMENTS 0 101 045 A3  6/1984  European Pat. Off. .
WO 92/15771  7/1992  United Kingdom .
WO 83/02296  2/1983  WIPO .

OTHER PUBLICATIONS

Cadmus et al.; "Bacterial Degradation Of Xanthan Gum;" Industrial Polysaccharides: Genetic Engineering, Structure/Property Relations And Applications; 1987; pp. 101–107.
William, Gidley & Schechter; "Chapter 10: Matrix Acidizing Of Carbonates;" Soc. Petrol. Eng. Of Aime; 1979; pp. 86–91.
NTIS TECH NOTES, No. 9, Sep. 1984m Springfield, Va., p. 626, 'bacteria aid in oil production and utilsation'.

Primary Examiner—William P. Neuder
Attorney, Agent, or Firm—Nixon & Vanderhye

[57] ABSTRACT

A method of acidising an underground reservoir comprises a) injecting into the reservoir (i) a substrate for an enzyme, which substrate is capable of being converted into an organic acid by the enzyme, and (ii) the enzyme; and b) allowing the enzyme to catalyse the conversion of the substrate into the acid.

24 Claims, No Drawings

ACIDIZING UNDERGROUND RESERVOIRS

The present invention relates to the use of enzymes in the production of oil, gas or water from an underground reservoir.

One third to a half of the world's hydrocarbon reserves are found in carbonate rock structures, in particular a large area of the Texas and Oklahoma oil and gas fields in the US, the Albertan oil and gas fields in Canada, the oil and gas reservoirs of Argentina and Oman and many onshore areas in Europe. Carbonate rock tends to have very low permeability particularly when there are no connected fractures present. Groundwater is often pumped from boreholes or irrigation wells in chalk or other carbonate formations.

In many sandstone reservoirs, the rock structure may be cemented together by carbonate, or carbonate scales may accumulate close to production wells as a result of carbon dioxide being released from solution due to a pressure drop. Another type of scale that can accumulate around production wells is iron scale, in particular iron oxides and hydroxides. Low permeability, drilling damage and accumulation of scale all impede the flow of oil to the production well and the conventional method used to open up channels around the well bore to improve the flow rate is the injection of acid (known as acidising or acid stimulation). There are two types of acid treatment: fracture acidising (injection of acid at rates above fracture pressure to etch the faces of the resultant fractures) and matrix acidising (injection of acid at rates below fracture pressure to dissolve flow channels in the rock or to remove scale or damage caused by drilling). Acid treatments are employed in all types of oil wells and occasionally in water wells: they may be used to open fractures or remove damage in newly drilled wells or to rehabilitate old wells from which production has declined. Acid (usually hydrochloric acid though acetic and formic acids are used on occasion when it is desirable to delay the spending of the acid) is pumped into the well, where it reacts with the calcium carbonate according to the following stoichiometry:

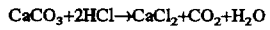

$$CaCO_3 + 2HCl \rightarrow CaCl_2 + CO_2 + H_2O$$

Calcium chloride ($CaCl_2$) is highly soluble in water and the acid etches channels in the rock, thus improving the oil or gas flow towards the production well. Hydrochloric acid reacts immediately with carbonate rock and tends to form a few large channels known as "wormholes" through the rock, rather than opening up the pore structure. The acid penetration distance is limited to a few feet at most.

Because hydrochloric acid reacts so rapidly when contacted with carbonate rock, a number of products have been developed which aim to reduce the reaction rate, allowing acid to penetrate further into the formation or to react more uniformly around the wellbore. The reaction of hydrochloric acid may be retarded by emulsifying, gelling or chemically retarding the acid. The reaction of acetic acid is naturally retarded because a build up of the reaction product, carbon dioxide, reduces the reaction rate. As carbon dioxide bleeds off into the formation or is absorbed by the oil, water or hydrocarbon gas, the reaction of acetic acid continues.

The benefits of retarded acids over conventional hydrochloric acid have been limited to date, since a significant permeability increase extending out at least 10 feet from the wellbore is necessary in order to obtain significant improvements in oil production rate (Williams, Gidley and Schechter, 1979 Ch. 10 in Acidizing Fundamentals, Soc. Petrol. Eng. of AIME, New York, Dallas).

Conventionally hydrocarbon wells in carbonate reservoirs are acidised immediately after drilling before production commences and often repeat treatments are conducted every two to three years.

In an alternative fracturing treatment to acid fracturing, fractures may be created by injecting sand suspended in an aqueous fluid (known as proppant) into a well at a rate above fracture pressure. When the injection pressure is removed, the sand remains in place, propping the fracture open. It is very unusual for a propped fracture subsequently to be treated with hydrochloric acid, since the rapid reaction rate between the acid and the rock may cause collapse of the fracture. However damage may be caused by the filtering out of gels from the proppant suspension on the fracture faces and this can substantially reduce the rate of oil or gas flow into the fracture.

Conventionally oil wells are drilled vertically down into the oil reservoir and through the payzone of the reservoir. Oil flows into the vertical wellbore. In recent years the drilling of wells out from the vertical wellbore in a horizontal direction through the reservoir has become widespread. In many cases horizontal wells have increased hydrocarbon production by several orders of magnitude.

The removal of drilling damage caused by accumulation of drilling mud filter cake and fine rock particles from horizontal wells is a very costly process due to the need to use specialist techniques, such as injection of acid through coiled tubing, to avoid corrosion of wellhead equipment and prevent hydrochloric acid being spent before it reaches the far end of the horizontal well.

Once primary production from a reservoir has been exhausted due to reduction of natural reservoir pressure, water or carbon dioxide gas may be injected to recover a further percentage of the oil-in-place. Water or gas is injected through a proportion of wells in the reservoir (injector wells), thus pushing the oil towards producer wells. In some reservoirs the rate of water injection is low and hence the oil production rate is low. Acid treatments are used to increase the injectivity of injector wells, although this is frequently not successful due to the inability of the acid to penetrate out into the formation.

The conventional acidisation technique has the advantage that it is quick, usually taking less than a day, and the raw material is cheap. However it has the disadvantages that the hydrochloric acid is highly corrosive, involving expensive and careful handling when being transported to the well and pumped downhole. Hydrochloric acid also corrodes equipment, such as pumps, casing and tubulars made of steel, chrome or aluminium. It requires the addition of sequestering agents to prevent iron precipitation in the reservoir and corrosion inhibitors to limit the damage to equipment. These chemicals are often hazardous and increase the complexity and the price of treatment. A further disadvantage is that the acid reacts too quickly in carbonate reservoirs and is frequently spent very close to the well bore (in the first few feet) and consequently does not open channels deeper into the formation.

The present invention therefore provides a method of acidising a hydrocarbon reservoir which comprises:

a) injecting into the reservoir (i) a substrate for an enzyme, which substrate is capable of being converted into an organic acid by the enzyme, and (ii) the enzyme; and b) allowing the enzyme to catalyse the conversion of the substrate into the acid.

The present invention provides a process by which acid can be produced in situ in the reservoir at a rate such that the acid is not all produced, and consequently not all spent, very close to the well bore.

The method of the present invention may be used to stimulate recovery from reservoirs found in all types of rock formation, but is preferably used when the reservoir is found in a carbonate rock formation or a rock formation in which carbonate rock cements together other types of rock, such as sandstone. Water and hydrocarbons, for example oil or gas, are generally recovered. The gas may be, for example, methane, ethane or butane.

Oil, gas or water is recovered from a reservoir by drilling a well bore into the reservoir and extracting the water, oil or gas. The well bore also serves as a convenient means for injecting the enzyme and substrate used according to the method of the present invention into the reservoir.

Once a suitable oil or gas field has been identified, it is necessary to select an enzyme which remains active under reservoir conditions. The following parameters are generally taken into consideration:

1) Temperature tolerance

The temperature of a reservoir is a function of its depth and can be in excess of 100° C. Many onshore reservoirs and some offshore reservoirs in carbonate formations are fairly shallow with temperatures falling within the 30°–60° C. range. Generally the enzymes used in the method of the present invention are active between 15° C. and 110° C., for example between 15° C. and 95° C. but an enzyme which is active at higher temperatures may also be used. The enzymes used in the process of the invention have a range of temperatures over which they are active. When there is a temperature gradient in the oil/gas well, it may be desirable to use two or more enzymes together to ensure acid production occurs over the temperature range within the well.

2) Pressure tolerance

Pressure is also a function of depth. Pressures in offshore reservoirs in, for example, the North Sea may exceed 500 atmospheres, whereas shallower on-shore fields are likely to be in the range 50–150 atm. If enzymes are to be injected at rates above fracture pressure, they must withstand injection pressures which will exceed reservoir pressure.

3) Salt tolerance

The ability to withstand high salt levels is important as reservoir brines can often be near saturated solutions. Enzymes may be injected in fresh water, but they will need to withstand the effects of salts diffusing into that fresh water.

4) Oil tolerance

Enzymes must be tolerant of oil although they may remain in the aqueous phase within the reservoir.

The enzyme used in the method of the present invention is generally a water soluble enzyme. It is advantageous for the enzyme to be readily water soluble. Preferably the enzyme is a hydrolase (EC 3) such as a lipase (EC 3.1.1.3) or an esterase (EC 3.1.1.1). Lipase may be obtained from wheatgerm, porcine pancreas, Alcaligenes sp, Aspergillus niger, Humicola lanuginosa, Pseudomonas fluorescens, Rhizopus delemar, Rh. japonicus, Rh. javanicus, Rh. niveus, Penicillium cyclopium, Aspergillus oryzae, Mucor javanicus, Mucor miehei, Candida lipolytica, Candida antarctica, Geotrichum candidum, Humicola acylhydrolase, Penicillium roquefortii, Candida cylindracea, Rhizopus arrhizue, Chromobacterium viscosum, Pseudomonas species or other sources. The genes coding for an enzyme may be transferred into another organism by genetic manipulation to improve production yields. Genetic engineering may also be used to increase temperature, pressure, salinity and/or metal tolerance of the enzyme. Esterases may be obtained from porcine liver or rabbit liver or other sources. Most preferably the enzyme is from porcine pancrease, Rhizopus arrhizus, Mucor javanicus or Aspergillus Sp. Generally the enzyme will be used in free form in solution but for some applications may be immobilized on a support. The enzyme may be in a controlled release formulation, for example in encapsulated form, to further delay the hydrolysis of the substrate and therefore the generation of acid.

The acid produced according to the method of the present invention is an organic acid, generally an aliphatic carboxylic acid. Preferably the acid is of formula $RCO_2H$ wherein R is hydrogen, a $C_1$ to $C_6$ alkyl or —R'—$CO_2H$ wherein R' is a bond or a $C_1$ to $C_6$ alkylene group. Most preferably the organic acid is acetic acid or formic acid.

The substrate is generally an ester of the acid with an alcohol of formula $R^2OH$ wherein $R^2$ is $C_1$ to $C_6$ alkyl or —R'—$CO_2H$.

Where the acid has a hydroxy substituent, the ester may be a cyclic ester such as a lactone.

The alkyl group may be a branched or straight chain group and may have at least one halogen or hydroxyl substituent. A $C_1$ to $C_6$ alkyl group is preferably a $C_1$ to $C_4$ alkyl group, eg. methyl, ethyl, propyl, isopropyl, butyl, sec.butyl or ter.butyl, more preferably it is propyl, methyl or ethyl. A $C_1$-$C_6$ alkyl group substituted by halogen may be a di- or tri-halo-substituted alkyl group in particular a trihalo-$C_1$-$C_6$ alkyl group. A halogen atom is eg. chlorine, bromine or fluorine, preferably it is chlorine or fluorine.

Preferably the substrate is ethyl acetate, 1,2-ethanediol diacetate, 1,2,3-propanetriol triacetate, methyl formate or methyl acetate. Most preferably the ester is methyl acetate, 1,2-ethanediol diacetate or 1,2,3-propanetriol triacetate.

Preferably the substrate is water soluble. For example methyl acetate is very water soluble.

When the substrate is methyl acetate the stoichiometry of the reaction between the substrate and water is as follows:

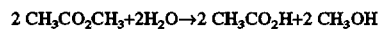

$$2\ CH_3CO_2CH_3 + 2H_2O \rightarrow 2\ CH_3CO_2H + 2\ CH_3OH$$

The substrate and enzyme may be injected into the reservoir simultaneously, sequentially or separately. The enzyme and substrate are generally injected as an aqueous solution. Generally the aqueous solution has a pH from 4 to 8, preferably 5 to 7.5, for example 6 to 7 and most preferably 6. When the substrate and enzyme are injected sequentially, the pH of the aqueous solution of substrate and the pH of the aqueous solution of enzyme may be the same or different. The enzyme and/or substrate solution may further contain chemical additives, for example at least one surfactant such as Nowsco's SS-100 (Trademark) as suspending agent for fine rock particles released during the treatment and oil-soluble surfactants to prevent sludge formation and chelating agents such as EDTA agents for iron control.

Since the pH of the injected liquid is neutral or near neutral there is little corrosion of, or reaction with surface injection equipment, down hole pumps or tubulars. Sequestering agents, which prevent iron precipitation and corrosion inhibitors are therefore not required in the method of the invention or are used in much smaller quantities than in conventional acidising techniques. Since the amount of acid produced by the action of the enzyme on the substrate increases slowly, there is a short period of time after enzyme is added to substrate when the solution has a very low concentration of acid. Acetic acid does not corrode steel, chrome or aluminium equipment.

The enzyme and/or substrate may be injected either above, at, or below the reservoir fracture pressure. The pressure may be varied during injection. When the acidising treatment is carried out at or above fracture pressure, the acidising reagents may be injected into the well bore with the hydraulic fracturing fluid, so that fracturing and acidisation are carried out simultaneously. When the fracture is propped open, the acidising treatment may be carried out after the fracturing treatment. Generally the fracture is propped open with sand and the acidising treatment is carried out at any stage during the life of the well for example, within 10 days to 3 months of the fracturing treatment.

The solution(s) of substrate and enzyme is (are) injected into a production well or water injection well. The enzyme is allowed to catalyse the conversion of the substrate into the acid. When the liquid is injected into a producer well, the well may be shut in for a period of 1 hour to 10 days, preferably 0.5 to 6 days after injection or, when the liquid is injected into an injector well, the injection of substrate and enzyme may be followed by continuous water injection.

After injection, the liquid penetrates deep into the reservoir before acid is produced in significant quantities. The acid is produced over several hours to days, so that acid is generated in situ in deep channels and pores.

The substrate is dissolved in water generally at concentrations of from 0.01 to 20% v/v, preferably from 0.1 to 10% v/v. The enzyme is dissolved in water generally at concentrations of from 0.00001 to 1% w/v (0.001 to 10% v/v (1% solution)) preferably 0.0001 to 0.01% w/v (0.1 to 0.5% v/v), most preferably 0.0005% w/v. The concentrations of substrate and enzyme are determined by the parameters of the reservoir such as permeability, injection rate, rock type, pressure and temperature. Depending on the reservoir conditions, enzyme or substrate concentrations may be used which are outside the ranges stated above.

Reaction rate is dependent on enzyme concentration. In an injector well it may be desirable to allow the injected solution to penetrate deep into the reservoir before acid production is complete and this may require between 1 hour and 10 days, for example 1, 2 or 5 days, more likely between 2 and 24 hours, usually at least 6 hours depending on reservoir parameters. To achieve this penetration, enzyme concentrations should preferably be from 0.00001 to 0.1% w/v (0.001 to 10% v/v of 1% solution). In a production well, long treatment times are disadvantageous because production time is lost. Therefore treatment times in production wells are minimised by using enzyme concentrations of from 0.0001 to 1% (w/v), (0.01 to 0.5% v/v of 1% solution).

The acid produced by the action of the enzyme on the substrate is allowed to react with the carbonate rock, or with the carbonate cement between sandstone rock formations until the acidisation is substantially complete. Completion of acidisation generally takes 0.5 to 10 days, usually 1 to 2 days. When the acid produced is acetic acid, the reaction is as follows:

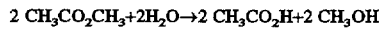

$$2\ CH_3CO_2CH_3 + 2H_2O \rightarrow 2\ CH_3CO_2H + 2\ CH_3OH$$

The products of the reaction between the acid and the carbonate, together with enzyme and any unreacted substrate, may be flushed through the reservoir with water or may be pumped back out of the reservoir in advance of renewed oil or gas extraction.

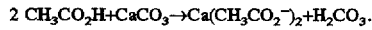

$$2\ CH_3CO_2H + CaCO_3 \rightarrow Ca(CH_3CO_2^-)_2 + H_2CO_3.$$

A by-product of the conversion of an ester into a carboxylic acid is an alcohol. When methyl acetate is converted into acetic acid, methanol is produced. The presence of methanol is advantageous because it lowers the surface tension between oil and water in the well, thus accelerating well clean-up.

In a further embodiment of the invention, there is provided the use of an enzyme in removing carbonate or iron scale, such as iron oxides in reservoirs and oilfield equipment. The enzyme and substrate are contacted with the carbonate or iron scale simultaneously, sequentially or separately. The enzyme is allowed to catalyse the conversion of the substrate into the acid. The acid is then allowed to react with the carbonate or iron scale.

The enzyme may be used to remove calcium carbonate scale from areas in hydrocarbon recovery operations in which scale build up impedes the flow of hydrocarbon. Such areas include pipework, pumps and tubulars, as well as sandstone or carbonate reservoirs.

The present invention has the following particular advantages over the prior art:

1) Enzymes and substrate can be pumped deep into the formation surrounding the wellbore prior to completing or commencing, for example prior to completing 10%, of acid production and calcium carbonate dissolution. They can therefore improve permeability in carbonate reservoirs in a much wider zone around the wellbore and along fractures than hydrochloric acid, which is spent rapidly very close to the wellbore or fracture face. The use of enzymes in conjunction with horizontal or radial drilling technology allows acid to be generated along the full length of the horizontal or radial well to bypass or remove drilling damage and deposits and enhance the treatment benefit. The use of enzymes to stimulate horizontal wells by removing drilling muds and deposits and gels offers major savings in equipment requirements and equipment downtime over the use of HCl. Since the injection fluid is non corrosive, coiled tubing is not needed to place the fluid and the fluid may be injected via the drill bit, slowly rotated as it is withdrawn after drilling operations. A KCl spacer may be used to remove the drilling mud, fill the annulus and avoid wasting the stimulation fluid. This offers the advantage of reduced downtime and no requirement for additional pumping equipment to carry out the treatment.

The use of enzymes to bypass or remove gel damage in sand-propped or acid fractures allows contact of acid with the full length of the fracture and enhances the treatment benefit.

The gradual production of acid by enzymes allows stimulation of a much wider zone around injector wells than HCl or acetic acid injected from the surface. It also allows the removal of damage from existing propped fractures along the full length of the fracture.

2) The enzyme and substrate are non corrosive. This reduces transportation and handling costs and eliminates corrosion of equipment at the surface and in the downhole pumps and tubulars.

The following Examples illustrate the invention.

EXAMPLE 1

Dissolution of Carbonate Rock

Methyl acetate (25 ml of 20% v/v) and lipase enzyme 0.012% w/v of lipase extracted from *Aspergillus sp* were added to 25 g of ground oolite carbonate rock in a 160 ml reaction bottle. Control samples contained oolite and lipase without methyl acetate or oolite and methyl acetate without lipase. The mixtures were incubated at 35° C. for 120 h. Samples were then removed from the bottles and centrifuged at 10,000 rpm for 5 min in a microfuge (Beckman) to remove particulate material. Concentrations of calcium ion and calcium acetate in the supernatant were measured.

Calcium ion concentration was measured using a spectrophotometric technique. Alkaline borate buffer (1 ml, 0.25M, pH 10.5) was added to 1 ml of supernatant and 1 ml of o-cresophthalein solution (prepared by dissolving 0.1 g 0-cresophthalein complexone, 2.5 g 8-hydroxyquinoline and 21 ml concentrated hydrochloric acid in 1 liter distilled water). The purple colour formed was measured spectrophotometrically at 575 nm. and results were compared with a standard curve. Calcium acetate and methyl acetate concentrations were measured using high pressure liquid chromatography (HPLC). Samples of supernatant (10 μl) were injected into a Hypersil ODS column (particle size 5 μm, internal diameter 4 mm, length 250 mm) in an HPLC (Hewlett Packard, series 1050) at a flow rate of 2 ml/min. Samples were eluted through the column in water initially and subsequently in acetonitrile. Calcium acetate (standards of 5, 10, 15 and 20% w/v) was shown to elute after 1.2 min and methyl acetate after 3.3 min under these conditions. The appearance of calcium acetate and the disappearance of methyl acetate in supernatant samples was measured.

After 120 h a maximum of 159.5 g/l dissolved calcium acetate was measured in reaction bottles containing oolite, methyl acetate and lipase. The methyl acetate concentration had decreased from 159 g/l to 29.3 g/l. Calcium acetate was not detected in control samples without either lipase or methyl acetate.

These results demonstrate the ability of a lipase to catalyse the conversion of methyl acetate into acetic acid, which dissolves the calcium carbonate in oolite to produce calcium acetate. The presence of 32 g/l calcium in solution indicated the dissolution of 80 g of calcium carbonate per liter of reaction fluid. This represents 36% of the typical dissolution power of 15% hydrochloric acid.

EXAMPLE 2

The Effect of Methanol on the Solubility of Calcium Acetate

Calcium acetate at concentrations of 10, 20, 30 and 40% (w/v) was dissolved in methanol solutions of 10, 20, 30, 40% (v/v) and incubated at 55° and 85° C. for 16 h. Samples were then observed for the presence of absence of precipitate.

Precipitation occurred in the presence of 30% (w/v) calcium acetate when >5% (v/v) methanol was added (Table 1). Precipitation from a 25% (w/v) solution of calcium acetate occurred when >20% (v/v) methanol was added and 30% (v/v) methanol was required to precipitate a 20% (w/v) solution of calcium acetate. The presence of methanol slightly decreased the solubility of calcium acetate in water, but precipitation of calcium acetate from solutions up to 25% (w/v) did not occur at methanol concentrations <20% (v/v) at 55° or 85° C.

EXAMPLE 3

Optimisation of Lipase Concentration

Oolite (25 g) and 30 ml of 10% (v/v) methyl acetate were added to 160 ml bottles together with lipase at one of the following concentration: 0.005, 0.001, 0.0005, 0.0001 and 0% (w/v) (0.5, 0.1, 0.05, 0.01 and 0% v/v of 1% solution). The mixtures were incubated at 45° C. at 150 rpm for 168 h. Samples were removed at intervals, centrifuged and analysed for calcium, calcium acetate and methyl acetate concentrations.

As enzyme concentration decreased, the reaction rate decreased. A solution of 0.0001% (w/v) (0.01% v/v of 1% solution) lipase only converted 27% of the methyl acetate present into acetic acid after 71 hours of incubation, whereas a 0.005% (w/v) (0.5% v/v of 1% solution) enzyme solution converted 70% of the methyl acetate into acetic acid in the same timescale (Table 2). Calcium acetate concentrations were not detectable after 5 hours at enzyme concentrations of 0.001% (w/v) (0.1% v/v of 1% solution) and below.

EXAMPLE 4

The Effect of Lipase/Methyl Acetate Treatment on Core Permeability

A limestone core (diameter 25 cm, length 3.68 cm) was placed in a CFA 100 core rig with a QRCH 200 series quick release core holder (Edinburgh Petroleum Services) at 45° C. and the permeability to water was measured. Ten pore volumes (1 pore volume=3.72 ml) of a solution of 10% (v/v) methyl acetate and 0.005% (w/v) (0.5% v/v of 1% solution) lipase were pumped through the core at a flow rate of 4.7 ml/min. Pumping then ceased and the core was incubated for 6 days. After this period water was pumped through the core >10 (pore volumes) and finally permeability was again measured.

The initial average permeability of the core to water was 21.4 mD; this value increased after lipase/methyl acetate treatment to 36.7 mD representing a 71.5% increase in permeability.

TABLE 1

| Calcium Acetate Concentrations (%, w/v) | Effect of Methanol on Calcium Acetate Solubility at 55 and 85° C. |||||||||||| 
|---|---|---|---|---|---|---|---|---|---|---|---|---|
| | Methanol concentration (v/v) |||||||||||| 
| | 5 || 10 || 15 || 20 || 25 || 30 || 
| | 55° C. | 85° C. | 55° C. | 85° C. | 55° C. | 85° C. | 55° C. | 85° C. | 55° C. | 85° C. | 55° C. | 85° C. |
| 5 | − | − | − | − | − | − | − | − | − | − | − | − |
| 10 | − | − | − | − | − | − | − | − | − | − | − | − |
| 15 | − | − | − | − | − | − | − | − | − | − | − | − |
| 20 | − | − | − | − | − | − | − | − | − | − | +++ | + |
| 25 | − | − | − | − | − | − | ++ | − | +++ | +++ | +++ | +++ |
| 30 | − | − | − | ++ | +++ | +++ | +++ | +++ | +++ | +++ | +++ | +++ |

− = no precipitate
+ = slight haze
++ = precipitate
+++ = dense precipitate

TABLE 2

Effect of Lipase Concentration on Reaction Rate

| | Enzyme Concentration (% w/v) | | | | | | | |
|---|---|---|---|---|---|---|---|---|
| | 0.0001 | | 0.0005 | | 0.001 | | 0.005 | |
| Time (h) | Methyl acetate | Calcium acetate | Methyl acetate | Calcium acetate | Methyl acetate | Calcium acetate | Methyl acetate | Calcium acetate |
| 0 | 12.44 | — | 12.56 | — | 12.21 | — | 11.41 | — |
| 5 | 10.48 | — | 11.29 | — | 10.37 | — | 10.02 | 0.94 |
| 23 | 9.79 | — | 9.44 | 1.07 | 8.75 | 1.60 | 7.02 | 4.08 |
| 29 | 9.56 | 0.29 | 9.21 | 1.86 | 8.29 | 2.51 | 6.33 | 5.27 |
| 47 | 9.44 | 1.20 | 8.29 | 2.78 | 7.36 | 3.82 | 4.71 | 6.44 |
| 53 | 9.33 | 1.46 | 8.18 | 4.08 | 7.13 | 4.74 | 4.60 | 7.36 |
| 71 | 9.10 | 2.12 | 7.83 | 4.87 | 6.56 | 5.92 | 3.44 | 8.14 |
| 77 | — | — | — | — | 5.64 | 6.28 | 3.10 | 9.19 |
| 95 | 8.25 | 2.65 | 6.99 | 5.29 | 5.29 | 6.57 | 2.29 | 9.45 |
| 167 | — | — | 5.29 | 6.83 | 2.87 | 8.14 | 0.56 | 10.24 |

EXAMPLE 5

Assessment of the Calcium Dissolution Performance of three Different Substrates for Lipase Lipase (0.001%, w/v) was added to 100 ml reaction bottles containing 20 g of ground oolite rock and either 33 mM (0.66%, v/v) 1,2,3-propanetriol triacetate or 50 mM (0.66%, v/v) 1,2-ethanediol diacetate or 100 mM (0.80%, v/v) methyl acetate. The different concentrations of the three substrates all produce an equivalent theoretical yield of 100 mM acetic acid when mixed with lipase. 100 mM acetic acid can theoretically dissolve 2.0 g/l of calcium from calcium carbonate. The reaction mixtures were incubated at 40° C. for 30 hours; samples were removed at intervals for analysis of soluble calcium.

Table 3 shows that all three substrates were effectively converted into acetic acid which dissolved calcium from the rock. 1,2-ethanediol diacetate and 1,2,3-propanetriol triacetate mixtures dissolved rock at twice the rate achieved by a methyl acetate substrate.

EXAMPLE 6

Comparison of the Rate of Rock Dissolution of Acetic Acid generated from 1,2,3-propanetriol triacetate using Lipase with that of Acetic Acid Lipase (0.0005%, w/v) was added to a 100 ml reaction bottle containing 0.66% (v/v) of 1,2,3-propanetriol triacetate and 5 g of ground oolite rock. Acetic acid (glacial, 100 mM) was added to a reaction bottle containing ground oolite only (5 g). The theoretical yield from 0.66% (v/v) 1,2,3-propanetriol triacetate is 100 mM acetic acid. The reaction mixtures were incubated at 40° C. for 43 hours; samples were removed at intervals for analysis of soluble calcium.

Table 4 shows that the reaction between acetic acid and oolite rock was complete within 10 minutes of contact, whereas when acetic acid was generated gradually as a result of the action of lipase on 1,2,3-propanetriol triacetate the reaction between the acid and the rock was not complete for at least 24 hours under the experimental conditions described above. The dissolution of the rock was delayed by the use of the lipase, generating acid gradually with time. The invention therefore offers a major advantage over the use of acetic acid injected from the surface for acidising the matrix deep within the reservoir.

EXAMPLE 7

Assessment of the Performance of Lipase and 1,2,3-Propanetriol Triacetate at removing Drilling Mud Damage from Cores Cores (1" diameter×1" height) were mounted in a small confining sleeve and inserted into leak off cells. A positive displacement pressure was applied to the head space of the cells from a bottled gas supply and the flow rate of liquid held in the headspace passing through the core and into measuring cylinders was measured.

Single core tests were carried out in a series of steps:

1. Determine permeability in direction A to B.
2. Invert core in sleeve and pump drilling mud in direction B to A measuring permeability.
3. Pump lipase (0.01%, w/v) and 1,2,3-propanetriol triacetate (0.05%, v/v) through the filter cake in direction B to A (dependent on mud caking properties).
4. Remove sleeve from leak off cells and seal face A with parafilm.
5. Incubate face B in a 50–60 ml bath of Lipase and 1,2,3-propanetriol triacetate at the concentrations listed under (3).
6. After 44 hours at 40° C. remove sleeve and remove excess drilling mud.
7. Invert core to original direction.
8. Remeasure permeability in direction A-B.

Initial permeabilities were read at 300 psi and drilling mud was pumped for 30 minutes to form filter cakes at 300 psi. Delta P was increased to 600 psi when lipase solution was pumped into the core and the regain permeability was recorded at a delta P allowing a measurable flow rate.

Cores were damages with three different drilling muds supplied by Baroid, (Aberdeen, Scotland).

After the incubation period, the CAT-1 mud filter cake was observed to dislodge from the core face, with bubbles appearing underneath the cake. Permeabilities of cores after lipase treatments were close to or in excess of initial core permeabilities (Table 5), indicating that the treatment had successfully removed or bypassed the drilling mud damage. Calcium concentrations in the eluted lipase solution had increased substantially indicating the dissolution of rock by the acetic acid generated.

TABLE 3

Comparison of Calcium Dissolution Performance of Three Different substrates for lipase Average Concentration of Calcium released from Oolite rock*
(g/l)

| Time (h) | 1,2-Ethanediol Diacetate | Methyl Acetate | 1,2,3-Propanetriol Triacetate |
|---|---|---|---|
| 0 | 0.52 | 0.48 | 0.70 |
| 3 | 0.70 | 0.47 | 0.93 |
| 6 | 0.89 | 0.55 | 1.11 |
| 8 | 0.99 | 0.66 | 1.21 |
| 25 | 1.73 | 0.93 | 1.77 |
| 30 | 1.87 | 0.92 | 1.97 |

*Results are averaged from triplicate tests.

TABLE 4

Comparison of the Rate of Rock Dissolution generated Acetic Acid and Acetic acid Concentration of Calcium released from Oolite Rock (g/l)

| Time (h) | Acetic Acid (100 mM) | 1,2,3-Propanetriol Triacetate (0.66% v/v) |
|---|---|---|
| 0 | 0.11 | 0.08 |
| 0.17 | 2.58 | 0.20 |
| 1 | 2.46 | 0.45 |
| 2.5 | 2.60 | 0.67 |
| 19 | 2.48 | 1.67 |
| 24 | 2.45 | 2.00 |
| 26.5 | 2.46 | 2.17 |
| 43 | 2.47 | 2.20 |

TABLE 5

Removal of Drilling Mud Damage from Cores using Lipase and 1,2,3-Propanetriol Triacetate

| Core No | Mud Type | Initial Permeability (mD) | Permeability after Mud Damage (mD) | Permeability after treatment (mD) | Calcium Concentration (g/l) Injected Solution | Calcium Concentration (g/l) Eluted Solution |
|---|---|---|---|---|---|---|
| 1 | CAT-1 | 0.55 | 0.03 | 0.39 | 0.30 | 5.12 |
| 2 | CAT-1 | 0.66 | 0.04 | 0.44 | 0.48 | 5.28 |
| 3 | Saturated Salt | 0.68 | 0 | 0.79 | | 2.88 |
| 4 | Saturated Salt | 0.73 | 0 | 0.83 | | 2.04 |
| 5 | KCl/polymer | 0.39 | 0 | 0.47 | | 2.08 |
| 6 | KCl/polymer | 0.50 | 0.01 | 0.66 | 0.05 | 3.08 |

We claim:

1. A method of acidising an underground reservoir which comprises:

a) injecting into the reservoir (i) an isolated enzyme, and (ii) a substrate for the enzyme, which substrate is capable of being converted into an organic acid by the enzyme; and b) allowing the enzyme to catalyze the conversion of the substrate into the acid.

2. A method according to claim 1 wherein the underground reservoir is a hydrocarbon reservoir.

3. A method according to claim 2 which further comprises recovering a hydrocarbon from the acidised reservoir.

4. A method according to claim 2 wherein the hydrocarbon is oil.

5. A method according to claim 2 wherein the hydrocarbon is a gas.

6. A method according to claim 1 wherein the underground reservoir is a water reservoir.

7. A method according to claim 6 which further comprises recovering water from the acidised reservoir.

8. A method according to claim 1 wherein the substrate is a carboxylic acid ester.

9. A method according to claim 1 wherein the substrate is an ester of an aliphatic carboxylic acid of formula $RCO_2H$ wherein R is hydrogen, an alkyl group having from 1 to 6 carbon atoms or —R'—$CO_2H$ wherein R' is a bond or an alkylene group having from 1 to 6 carbon atoms and wherein R and R' optionally have at least one halogen or hydroxyl substituent.

10. A method according to claim 1 wherein the substrate is methyl acetate, ethyl acetate, methyl formate or 1,2-ethanediol diacetate, or 1,2,3-propanetriol triacetate.

11. A method according to claim 1 wherein the enzyme is water soluble.

12. A method according to claim 1 wherein the enzyme is a hydrolase.

13. A method according to claim 1 wherein the enzyme is a lipase or an esterase.

14. A method according to claim 1 wherein the enzyme is in the form of a delayed release formulation.

15. A method according to claim 1 wherein the enzyme and substrate are injected into the well bore simultaneously.

16. A method according to claim 1 wherein the enzyme and/or substrate are injected at a rate at or above the reservoir fracture pressure.

17. A method according to claim 1 wherein the enzyme and/or substrate are injected at a rate below the reservoir fracture pressure.

18. A method according to claim 1 wherein the reservoir is a carbonate rock structure.

19. A method according to claim 1 wherein the substrate (i) and enzyme (ii) are injected into the reservoir via a well bore which extends to the reservoir.

20. A method according to claim 19 wherein the well bore is horizontal or radial.

21. A method according to claim 1 which further comprises removing or bypassing drilling mud deposits or gel.

22. A method of removing carbonate or iron scale from an underground reservoir or from oilfield equipment, which comprises contacting the carbonate or iron scale with (i) a substrate for an enzyme, which substrate is capable of being converted into an organic acid by the enzyme, and (ii) the isolated enzyme.

23. A method according to claim 1 when carried out with a fracturing or matrix treatment.

24. A method according to claim 22 when carried out with a fracturing or matrix treatment.

* * * * *